Jan. 29, 1963     E. P. GOODMANN ETAL     3,075,914
LIQUID PHASE CONTACTING OF HYDROCARBONS
Filed Aug. 18, 1960                         2 Sheets-Sheet 2
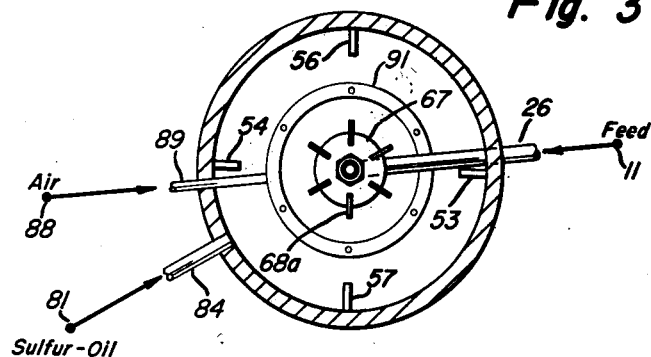
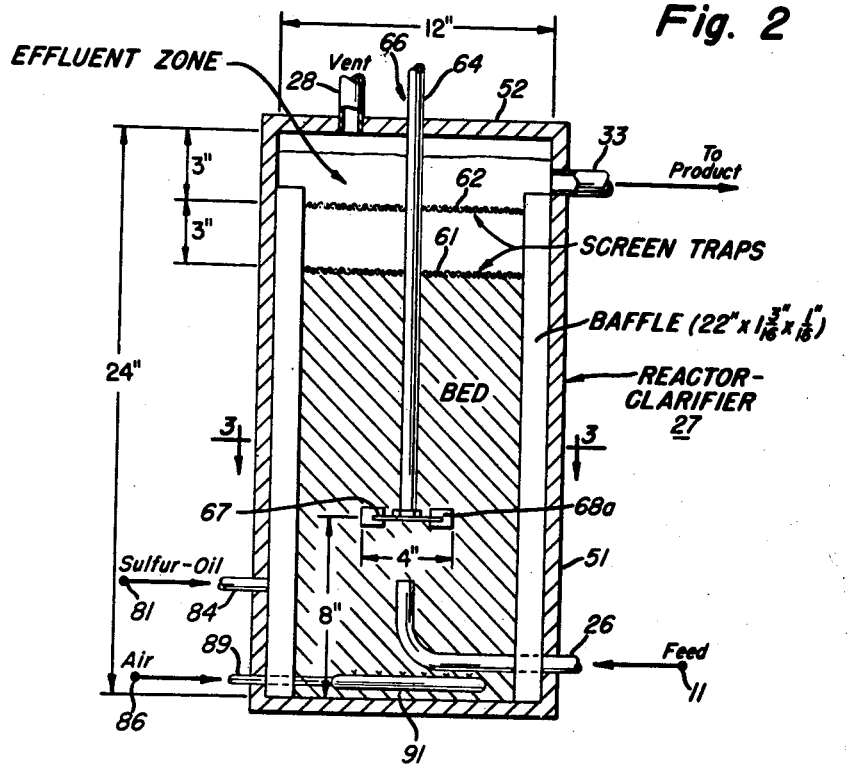
INVENTORS:
Eugene P. Goodmann
Moses Gordon
George E. Thompson
BY Michael Dufney
ATTORNEY

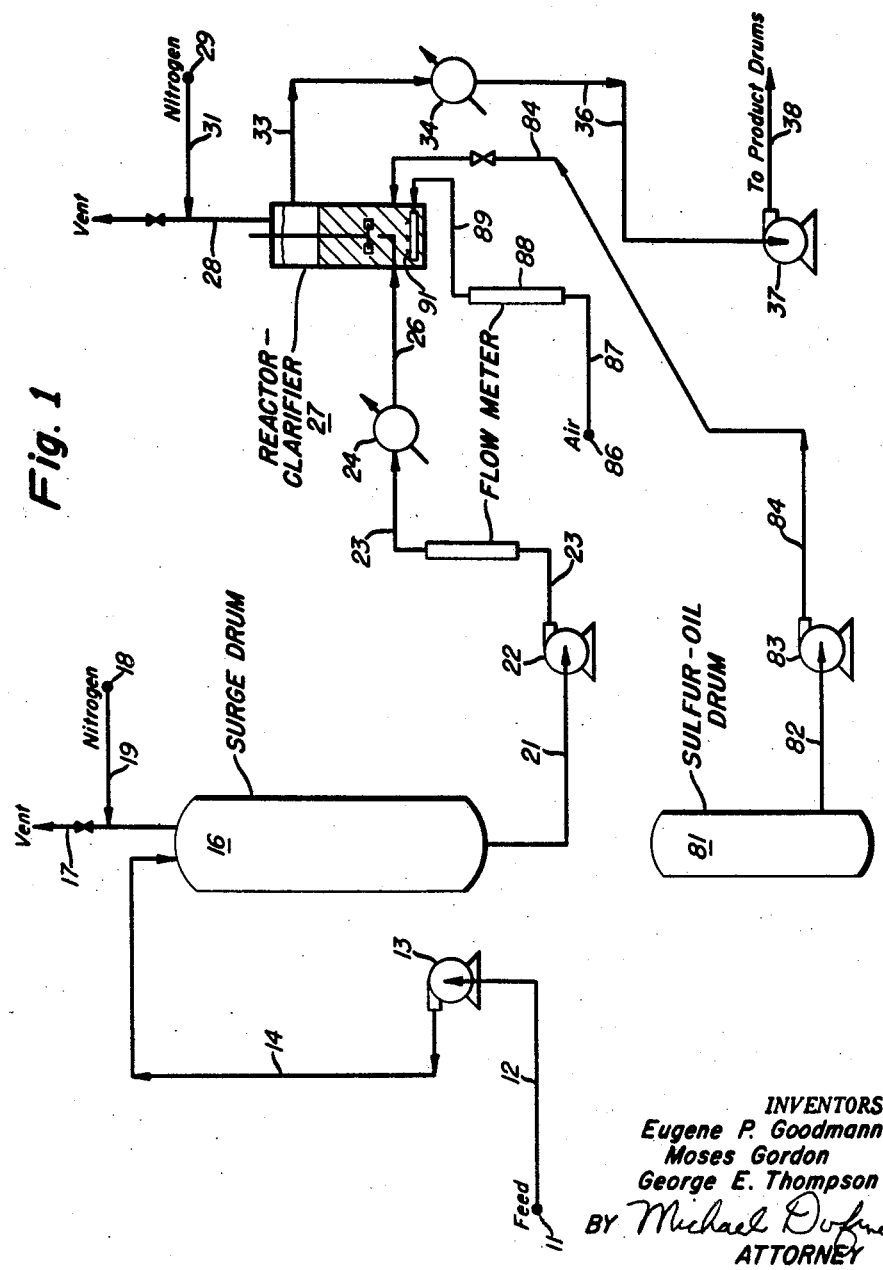

United States Patent Office 3,075,914
Patented Jan. 29, 1963.

3,075,914
LIQUID PHASE CONTACTING OF HYDROCARBONS
Eugene P. Goodmann, Highland, Ind., and Moses Gordon and George E. Thompson, Chicago, Ill., assignors to Standard Oil Company, Chicago, Ill., a corporation of Indiana
Filed Aug. 18, 1960, Ser. No. 50,439
8 Claims. (Cl. 208—199)

This invention relates to the contacting of hydrocarbon distillates and aqueous caustic media to produce product hydrocarbons essentially free of aqueous caustic medium.

The petroleum industry and the chemical industry utilize large and small scale operations requiring the contacting of liquid hydrocarbons with an aqueous medium. Such contacting results in liquid hydrocarbon containing droplets of aqueous medium dispersed therein. In the petroleum industry such a hydrocarbon is commonly spoken of as being "hazy." Various procedures are known for removing this dispersed aqueous medium from the liquid hydrocarbon.

Recently, it has been discovered that haze-free product could be obtained by carrying out the contacting in a particular manner where hydrocarbon droplets are dispersed throughout a continuous phase of aqueous medium. This type of contacting is disclosed in our copending applications Serial No. 805,289, filed April 9, 1959; Serial No. 823,458, filed June 29, 1959; and Serial No. 845,455, filed October 9, 1959. Now it has been found that with the more viscous hydrocarbon distillates, i.e., materials boiling within the range of 350° F. to 800° F., and aqueous caustic media, it is sometimes hard to maintain a stable dispersed liquid system—the system hovers on a change from an aqueous continuous phase to a hydrocarbon continuous phase. Operation of this condition is possible but, from the standpoint of operator attention and possible operational upset, is very undesirable. This invention is directed to a solution to this problem.

The method of the invention utilizes a dispersed liquid system characterized by (a) an aqueous caustic medium as the continuous phase, there is present in the aqueous caustic medium, between about 0.1 and about 3 weight percent, based on said medium, of a finely divided solid adsorbent material, such as, charcoal, (b) liquid hydrocarbon distillate droplets forming the dispersed phase and at least a substantial part of the total dispersed system, (c) a grease-like appearance, and from which system is readily separable clear essentially aqueous-medium-free liquid hydrocarbon.

This dispersed liquid system is obtained by contacting the liquid hydrocarbon with the aqueous caustic medium in various ways which will be described in particular hereinafter. A clear essentially aqueous-medium-free liquid hydrocarbon, i.e., haze-free liquid hydrocarbon, is readily separated from the dispersed liquid system. The process may be a continuous one wherein the dispersed liquid system is maintained and a supernatant layer of haze-free hydrocarbon formed above the dispersed system; said liquid hydrocarbon is then added continuously into a lower portion of the dispersed system and clear haze-free liquid hydrocarbon is continuously withdrawn from the supernatant layer. In some cases, a third layer may be formed providing a three layer system; in this system fresh aqueous caustic medium and hydrocarbon feed are continuously added to the dispersed system while hydrocarbon product is continuously withdrawn from the supernatant layer and "exhausted" aqueous medium is continuously withdrawn from the bottom layer—said three layers being present in the vessel.

The outstanding characteristics of the dispersed liquid system, as it is seen by the human eye, is the shiny surface and smooth undulating ripples at the hydrocarbon-system interface—resembling a light grease being agitated by a propeller mixer. The surface sheen and the undulating flow appearance of the surface of the dispersed liquid system has caused this system to be generally described as "appearing grease-like." The appearance of the surface of the dispersed liquid system does not markedly change with reasonable changes in the degree of agitation being applied to the system. The dispersed liquid system is a good conductor of electricity which shows that it is an oil-in-water dispersion.

The dispersed liquid system can be formed by contacting a small amount of liquid hydrocarbon with an aqueous caustic medium or a small amount of aqueous caustic medium with liquid hydrocarbon. At very low hydrocarbon content it is difficult to maintain the desired oil-in-water characteristics of the dispersed liquid system; the optimum proportion of hydrocarbon and aqueous caustic medium for a particular use is determined by the type of hydrocarbon, the concentration of caustic in the aqueous medium and the temperature of contacting. (Hereinafter the terms "aqueous caustic medium" and "aqueous medium" have the same meaning and are used interchangeably.)

The outstanding result obtainable with the dispersed liquid system of contacting is the clarity of the liquid hydrocarbon product. In spite of the intimate contacting between the liquid hydrocarbon and the aqueous caustic medium in the dispersed liquid system, the liquid hydrocarbon product contains essentially no dispersed aqueous caustic medium and may be described as essentially haze-free. Or in another term the liquid hydrocarbon product has a bright appearance.

The liquid hydrocarbon feed to the instant method may be any hydrocarbon distillate which boils within the range of 350° F. to 800° F. The liquid hydrocarbon may be a single compound or mixture of close boiling compounds or may be a mixture boiling over a narrow or broad range within the limits of 350° F.–800° F. Examples of petroleum fractions suitable for use in the method are: kerosene, boiling over the ASTM range of about 350° F.–525° F.; gas oil, boiling over the ASTM range of 450° F.–700° F.; heater oil boiling over the ASTM range of 375° F.–650° F. The method is applicable to liquid hydrocarbons whether they be aliphatic or aromatic in nature; whether they be saturated or unsaturated; whether they be "straight" chain or cyclic. Furthermore, the petroleum hydrocarbon fractions may be derived from any of the known refining operations such as distillation of crude, thermal cracking, catalytic cracking, coking, thermal reforming, catalytic reforming, catalytic desulfurization or hydrogenation.

The aqueous caustic medium utilized in the formation of the dispersed liquid system may be an aqueous caustic solution or an aqueous caustic solution containing dissolved phenolic compounds. The aqueous caustic solution may contain any of the alkali metal hydroxides, particularly sodium hydroxide or potassium hydroxide. In general the solution may contain from 5–10 weight percent up to substantially the saturation amount of caustic at the particular temperature of operation. The aqueous caustic solution concentration will be dependent upon the particular usage, for example, in the removal of hydrogen sulfide, low concentrations on the order of 5–10 weight percent will generally be used. In the extraction of mercaptans from mercaptan-containing hydrocarbons, i.e., sour hydrocarbons, the solution will generally contain on the order of 10–25 percent caustic. In some instances of operation with aqueous caustic solution, a substantial saturation amount of caustic will be desirable, such as, in dehazing a viscous gas oil when operating at higher temperatures of contacting, i.e., about 40–50% at about 120° F.

The phenolic compounds may be cresols and xylenols. The mixture of cresols derivable by aqueous caustic extraction of thermal cracked naphthas is a particularly suitable phenolic material. In the contacting of a gas oil with aqueous caustic solution it is preferred to have the solution contain between about 1–20 volume percent, based on solution, of phenolic compounds—these exist in the solution in the form of alkali metal phenolates, or in the case of petroleum cresols in the form of alkali metal cresylates.

In the removal of materials such as mercaptans from liquid hydrocarbons by contacting with aqueous caustic solution, the presence of phenolic compounds improves the effectiveness of the mercaptan removal. In the case of mercaptan extraction it is desirable to use higher amounts of phenolic compounds and particularly petroleum cresols on the order of 15–35 volume percent—present in the form of alkali metal cresylates. The method of the invention is particularly suitable for use with aqueous caustic solutions which are substantially saturated with cresols.

The aqueous caustic medium (aqueous medium) used in the method of the invention includes, dispersed therein, finely divided solid adsorbent material. This material is present in an amount, based on aqueous medium, of between about 0.1 and about 3 weight percent. More usually the amount of material is about 0.3–1.5%. Particles on the order of 20 mesh size are suitable; more finely divided material is preferred, such as 60 or 100 mesh size. It is preferred to add the absorbent material to the aqueous medium before the dispersed system is formed. The solid adsorbent materials suitable for use in the process; the active carbons, such as activated charcoal and bone char; the various porous clays, such as fuller's earth and bentonite; the aluminous materials, such as synthetic silica-alumina and silica-magnesia; the alumina materials, such as alumina; the bauxitic materials, such as bauxite; and the silica gels and similar solids such as silica aerogels.

The method of the invention may be used at any temperature wherein the aqueous medium and the hydrocarbon are liquid. Broadly, the temperature of contacting may be between about 50° F. to 300° F. A more common range of temperatures is the region of 80° to 150° F. It is preferred to operate at the lowest temperatures consistent with the formation and maintenance of a stable dispersed liquid system. For example, when operating with the lower viscosity hydrocarbons such as kerosene it is preferred to operate at a range between about 70° F.–100° F. In the case of gas oils and such high viscosity fractions, in general, the operation will be on the order of 120° F.–150° F.

The dispersed liquid system contacting zone of the invention can be formed by many intermingling procedures. Some procedures permit the formation of the dispersed liquid system much more easily than do others. It is entirely possible to form a dispersed liquid system by introducing into a centrifugal pump at proper conditions the liquid hydrocarbon and aqueous medium; the two liquids emerge from the pump in the form of a dispersed liquid system, which is then passed to a settling vessel wherein the bright hydrocarbon is separated from the aqueous medium.

In another procedure the dispersed liquid system is formed by the use of a propeller mixer or turbine mixer in a vessel wherein the liquid hydrocarbon and the aqueous medium may be introduced continuously and the dispersed liquid system withdrawn continuously to a separate vessel, then separated from the aqueous medium and the bright liquid hydrocarbon product. The dispersed liquid system may be formed by the use of any impeller such as a propeller mixer or turbine mixer. When utilizing an impeller it is customary to have the impeller shaft on the vertical axis of the vessel containing the dispersed liquid system; the impeller may be in this instance of the top-entry or bottom-entry type. The dispersed liquid system may be prepared by the use of side-entry impellers when the configuration of the vessel makes this the preferred manner of introducing the agitation means.

When using an impeller positioned on the vertical axis of the vessel, it is preferred to improve the degree of agitation by installing vertical mixing baffles at the periphery of the vessel. These vertical baffles need project into the interior of the vessel only a relatively short distance in order to provide the additional turbulence needed to form and improve maintenance of the dispersed liquid system.

It is to be understood that the particular type of agitating means and the presence of or absence of baffles is a matter which may be determined by ordinary skill for a particular installation, after one has had the benefit of this disclosure and in particular, the illustrative examples, which form a part of this specification and disclosure.

The preferred mode of use of the method of the invention involves the use of a single vessel which functions not only as the contacting zone but also as the separation zone. By this it is to be understood that there are present in the vessel a dispersed liquid system layer (zone) and at least a supernatant bright liquid hydrocarbon product layer. Because this single vessel provides not only the desired contacting between the liquid hydrocarbon feed and the aqueous medium, but also produces a clear bright liquid hydrocarbon product, the term "Reactor-Clarifier" has been applied to the vessel affording this unitary contacting-clarification result.

When operating a unitary Reactor-Clarifier it is preferred to utilize an impeller selected from the class consisting of propeller mixers and turbine mixers, and more particularly, a top-entry mixer, which mixer is positioned on the vertical axis of the Reactor-Clarifier. The dispersed liquid system zone may be formed either by adding the aqueous medium and a sufficient amount of liquid hydrocarbon feed separately to the Reactor-Clarifier, or introducing the two amounts substantially simultaneously while the impeller is in motion.

Assuming the aqueous medium and the desired amount of liquid hydrocarbon feed have been introduced into the Reactor-Clarifier individually forming a lower aqueous medium phase and an upper liquid hydrocarbon feed phase, the blades of the impeller should be positioned in at least a proximate relationship to the aqueous medium. It is to be understood that the blades of the impeller may be entirely immersed in the aqueous medium, or substantially immersed therein, or may be entirely immersed in the hydrocarbon phase, a short distance above the top of the aqueous medium phase. Apparently sufficient intermingling of the two phases is obtained to form the dispersed liquid system when the impeller is entirely within the aqueous medium phase, but it is very difficult to form the dispersed liquid system when the impeller is in the hydrocarbon phase unless the impeller is capable of drawing substantial amounts of aqueous medium up into the hydrocarbon phase.

The position of a tubine mixer near the interface between the two phases is more critical than that of the propeller. It is preferred to use a propeller which forces the liquid upwards; in this instance forces aqueous medium upwards into the hydrocarbon phase. When using such an up-flow propeller good results are obtainable even when the propeller blades are positioned a substantial distance above the interface of the aqueous medium and liquid hydrocarbon phases.

The impeller is turned on at a speed which will form the dispersed liquid system; this speed is dependent on the type of impeller, the type of hydrocarbon feed, the type of aqueous medium and the temperature of contacting. At the proper conditions very quickly the separate phases of aqueous medium and liquid hydrocarbon disappear and there is present in the Reactor-Clarifier what appears to the human eye as viscous creamy liquid. The surface of this liquid presents a smooth undulating appearance like a pool of water into which a small stone has been dropped. In a vessel with transparent sides the dispersed liquid system gives to the eye an impression of violent turbulent motion. A dispersed liquid system, which is on the border line of stability may be, to the eye, a mixture of oily droplets and aqueous medium. A stable system does not, to the naked eye, show the presence of dispersed droplets.

The most important identifying characteristic of the dispersed liquid system utilized in this invention is the appearance of hydrocarbon product emerging from the dispersed liquid system. It has been found, to the eye, that the dispersed liquid system can produce a supernatant layer of liquid hydrocarbon which supernatant liquid hydrocarbon is essentially free of droplets of aqueous medium and is transparent—insofar as the natural color of the hydrocarbon permits; in practice the emergence of the supernatant hydrocarbon layer may be determined by decreasing the degree of agitation given the dispersed liquid system for its initial formation. After the reduction in degree of agitation a finite period of time elapses before a significant amount of hydrocarbon emerges from the dispersed liquid system. The reason for this initial time lapse is not understood, but may be due to the initial time needed to coalesce a number of dispersed droplets to exceed the capacity of the dispersed liquid system for holding same or it may be due to the mere passage of time needed to accumulate enough supernatant hydrocarbon to become perceptible to the naked eye. In any event after the emergence of a visible supernatant layer, the supernatant layer rapidly increases in depth and finally attains a fixed depth dependent somewhat upon the degree of agitation being imparted to the dispersed liquid system. The rate of emergence of bright hydrocarbon product appears to be most closely related to the composition of the dispersed liquid system, i.e., the relative amounts of oil and aqueous medium present, and the type of oil and aqueous medium present.

It has been observed in continuous operation wherein two or three layers exist in a Reactor-Clarifier the volume occupied by the dispersed liquid system layer increases with the time of contacting. This increase in volume has been designated "bed expansion" and apparently eventually takes place, regardless of the aqueous medium and with all types of hydrocarbon feed. Interestingly enough it has been found that a reduction in the amount of dispersed liquid system, on a weight basis, by physical removal of a portion thereof does not interfere with the production of a bright clear liquid hydrocarbon product. This indicates that in the experiments carried out the thickness of the dispersed liquid system layer has always been greater than the minimum amount needed to obtain the needed degree of contacting with simultaneous production of a bright clear product.

It has been observed that in situations wherein considerable amounts of material are removed from the hydrocarbon feed such as dispersed water or mercaptans that the dispersed liquid system produces in addition to the supernatant hydrocarbon layer a third layer—below the dispersed liquid layer. This third layer—commonly spoken of as the bottom layer—consists of aqueous medium of a different composition than that aqueous medium used to form the system. The precipitation of the third layer is most readily obtained with "fresh" aqueous medium being continuously introduced into the dispersed liquid system layer, as is necessary in continuous operation for mercaptan extraction. The third layer is preferably continuously withdrawn from the Reactor-Clarifier and discarded or worked to recover reusable aqueous medium. Thus, in mercaptan extraction the bottom layer consists of aqueous caustic solution, alkali metal cresylates captides—this solution is commonly spoken of as a mercaptan-rich solution. The mercaptan-rich solution may be regenerated by any of the techniques well known to the petroleum industry and the chemical industry to remove all or substantially all of the mercaptans and produce an aqueous caustic solution which is lean in mercaptans and which is commonly spoken of as lean solution; this lean solution may be recycled to the dispersed liquid system layer for extraction of additional amounts of mercaptans.

The method of this invention is illustrated hereinafter by illustrative examples carried out on pilot plant-scale equipment. The equipment utilized in carrying out the illustrative examples is set out in accurate detail in order to enable, those who wish, to easily duplicate the same. Additional information may be obtained from the aforementioned Serial Numbers 805,289, now U.S. Patent No. 3,011,970; 823,458 and 845,455.

The invention is described with particular reference to a pilot plant operation carried out in equipment shown in the figures.

FIGURE 1 shows the layout of the pilot plant schematically.

FIGURE 2 shows the type of Reactor-Clarifier used in the treatment of hydrocarbons when only two layers are present during the treating operation.

FIGURE 3 shows a cross sectional view at 3—3 of the Reactor-Clarifier of FIGURE 2.

*Example I*

In FIGURE 1, the hydrocarbon feed to the process was obtained from source 11. In this instance, source 11 was a 40 bbl. tank. (Throughout this specification, it is to be understood that "bbl." means a 42 gallon barrel.) Nitrogen was used to provide an inert atmosphere. Feed from source 11 was passed by way of line 12 to pump 13. Pump 13 forced the feed by way of line 14 into surge drum 16. Surge drum 16 had a capacity of 0.5 bbl. Surge drum 16 was provided with a vent system 17. Nitrogen from cylinder 18 may be passed by way of line 19 and a portion of the vent line into surge drum 16 to provide an inert atmosphere.

From surge drum 16, feed was introduced by way of line 21, pump 22, and line 23, heat exchanger 24, and line 26 into Reactor-Clarifier 27. Line 23 was provided with a flow meter for checking the charge rate of the feed to Reactor-Clarifier 27. In this operation, a Rotameter was used to determine the flow rate. Heat exchanger 24 permitted operation at temperatures above ambient. Reactor-Clarifier 27 was provided with a vent system 28.

Product oil was withdrawn by way of line 33, heat exchanger 34, line 36, and passed by means of pump 37 and line 38 to drums used for storing the product. An inert nitrogen atmosphere was maintained in the drums.

Reactor-Clarifier 27 was a cylindrical vessel 51 (see FIGURES 2 and 3) provided with a stainless steel top closure 52. Vessel 51 was made out of Lucite in order to permit visual observation of the goings-on within the Reactor-Clarifier. The internal diameter of vessel 51 was 12" and the overall internal height was 24". Reactor-Clarifier 27 was provided with four vertical baffles positioned against the vertical wall of vessel 51 and equidistant at the periphery thereof. These baffles 53, 54, 56, 57 were stainless steel strips 22" long, 1 3/16" wide, and 1/16" thick. While the dispersed liquid system can be obtained within the Reactor-Clarifier without using vertical baffles, the dispersed liquid system is more easily attained and maintained by the presence of vertical baffles such as 53, 54, 56 and 57.

Screens 61 and 62 are positioned in the upper portion of vessel 51. Screen 61 was positioned approximately 18" above the bottom of vessel 51 and screen 62, 3" above screen 61. Each of the screen traps was made up of four individual screens, namely, two plastic screens of 20 mesh opening sandwiched between two stainless and is rich in mercaptans in the form of alkali metal mersteel screens of 5 mesh opening. These screens serve to impede the carryover of aqueous solution, as blobs, by rising bubbles of air or oxygen.

Reactor-Clarifier 27 was provided with a mixing means 64. In the FIGURES 2 and 3 mixing means 64 consisted of a ⅓ H.P. motor, not shown, connected by shaft 66 to turbine 67 provided with 6 flat blades 68a, etc, operated at about 250–300 r.p.m.

Feed line 26 entered vessel 51 about 2″ above the bottoms; line 26 is preferably bent at right angles upward at the radial center of vessel 51 so as to introduce the feed below turbine 67; in Example I line 26 ended at the inner wall of vessel 51.

FIGURE 2 shows the layout of Reactor-Clarifier used in Example I approximately to scale; in addition, dimensions are provided to assist those who desire to duplicate the experimental work set out in this illustrative example.

The feed stock to Example I was a heater oil distillate with an API gravity of 42; and ASTM distillation range of 335–590° F. and a mercaptan number of 8–10 (mg. mercaptan sulfur per 100 ml. of naphtha).

The aqueous caustic medium charged to Reactor Clarifier 27 in Example I contained 22.2% by weight of total sodium hydroxide, i.e., free and combined; 1.50 weight percent PbO present as sodium plumbite, 0.5 weight percent of activated charcoal and 0.5 weight percent of 60–300 mesh fuller's earth.

The dispersed liquid system was prepared by introducing 4.5 gals. of the doctor solution and then the adsorbent solids into Reactor-Clarifier 27. A sweet oil was charged in an amount of 4.5 gals. to Reactor-Clarifier 27. Two layers were present after the introduction of the feed and the aqueous medium. The lower layer of aqueous medium extended upward to a point just beyond the upper surface of blades of the impeller 67. The impeller was rotated at 250–300 r.p.m., and almost immediately the two layers merged into one (to the eye) body of liquid, i.e., the dispersed liquid system; then sour oil was charged;

When no solid adsorbent was present in the doctor solution, it was very difficult to form the dispersed liquid system and more difficult to maintain the system—the mixture tended to invert to the undesirable water-in-oil system. With the solids present, the dispersed liquid system was easily formed and was maintained without effort during the total run.

The dispersed liquid system in the vessel was opaque with a grayed milky coloring. The surface of the dispersed liquid system at the interface had a grease-like appearance. From the appearance of the surface of the dispersed liquid system it would be though that the system was very viscous in character; the top of the system showing shallow undulations, resembling ripples in a pool of water, more or less concentric about the shaft of the turbine. Increasing the impeller speed changed the appearance of the top of the system causing greater turbulence; under these conditions of more turbulence, the upper surface tended to resemble a cake batter in the bowl of an electric mixer. In another analogy, the dispersed liquid system within the Lucite vessel resembled a clear glass jar of cold cream, even to the shallow wavy appearance usually present on a freshly opened jar of cold cream. In the particular dispersed liquid system, the surface of the system was shiny, resembling a light grease in light reflectivity; this surface shine coupled with the flow characteristics of the surface can be described as a grease-like appearance.

Electrical conductivity tests showed that the dispersed liquid system is a good conductor of electricity, thereby providing the presence of an oil-in-water dispersion. The dispersed liquid system is characterized by the aqueous medium as the continuous phase and liquid hydrocarbon droplets as the dispersed phase.

When a sample of the dispersed liquid system is introduced into a funnel provided with a stopcock in the stem, the system flowed like a highly viscous fluid through the stopcock and the stem—resembling in this respect a semi-fluid grease.

A sulfur-oil solution containing 0.3 weight percent of elemental sulfur was prepared by dissolving sulfur in sweet oil. This sulfur-oil solution was held in drum 81, at a temperature of about 120° F. The sulfur-oil was passed by way of line 82, pump 83 and valved line 84 into Reactor-Clarifier at a point about 5 inches above the bottom of the vessel. In this example sulfur was added at a rate of 200% of the theoretical requirement—for converting all of the mercaptans in the feed to disulfide—and a doctor sweet oil was obtained. The sulfur addition was varied over the range of 200%–480% without effect on operations.

Oxygen was introduced from source 86 by way of line 87, flow meter 88, line 89 and dispersion ring 91. Air or oxygen is essential to the regeneration reaction. Lead sulfide particles accumulated in the dispersed liquid system when no oxygen was introduced into the Reactor-Clarifier. The dispersed liquid system phase changed from a creamy gray color to "black"; the oil layer above the system zone turned "red"—probably from dissolved lead mercaptides—and became sour. The black color of the system phase and the red color of the oil layer disappeared soon after oxygen was again introduced into the Reactor-Clarifier.

The Reactor-Clarifier was maintained at about 130° F.

Over a period of 4 days, continuous operation was carried out at flow rates of up to 21 gallons per hour. During these days, the height of the dispersed liquid system remained essentially constant at 18 inches and the product hydrocarbon layer at about 4 inches. The remarkable feature of the upper hydrocarbon layer was its clarity. The hydrocarbon which separated from the dispersed liquid system under these conditions is completely free of haze in spite of the very intimate contacting of the oil and the doctor solution during the residence time of the oil in the dispersed liquid system. The clarity of the oil separated from the dispersed liquid system is vividly illustrated by holding a printed page in back of a quart sample bottle full of the product—the printing could be easily read through the sample bottle, i.e., about a 3″ thickness of hydrocarbon.

The product oil was doctor sweet, of good copper strip and not adversely affected in any way—as compared with conventional doctor sweetening operations.

Periodically during the 4 day run, samples of the system were withdrawn and the oil separated from the doctor solution. The doctor solution was analyzed for NaOH and plumbite content. At the end of the run, the solution contained 21.4 weight percent of total NaOH and 1.48 weight percent PbO present as sodium plumbite.

*Example II*

This example was carried out using the pilot plant equipment of Example I; except that a different Reactor-Clarifier was used. The Reactor-Clarifier of Example II was constructed on the same plan as that of Example I except that the diameter was only 6 inches. The turbine impeller was two inches in diameter, provided with six blades and positioned 4 inches above the bottom of the vessel. Cylinder oxygen was used for regeneration.

The feed to this example was a blend of virgin gas oils having the following characteristics:

| | |
|---|---|
| Gravity, °API | 39.3 |
| ASTM dist., °F.: | |
| Initial | 376 |
| 10% | 426 |
| 50% | 487 |
| 90% | 542 |
| Maximum | 596 |
| Color, Saybolt | −6 |
| Mercaptan No. | 20 |

The doctor solution was prepared from 25% aqueous sodium hydroxide and enough PbO to provide 2.0 weight percent of PbO. About 0.5 weight percent of 60–3000 mesh fuller's earth was present. The dispersed liquid system phase was formed by adding equal volumes of doctor solution and sweet gas oil to the vessel and rotating the turbine at about 500 r.p.m. Sour oil was introduced into the reactor and clear, sweet oil obtained when sulfur was also added.

(At this caustic concentration, a stable dispersed system could not be obtained without the use of fuller's earth.)

Thus having described the invention, what is claimed is:

1. A continuous method of contacting a feed liquid hydrocarbon distillate boiling within the range 350° F. to 800° F. with an aqueous caustic medium containing about 0.1 to 3 weight percent of finely divided solid adsorbent material which method comprises (a) forming a zone containing a dispersed liquid system characterized by: aqueous caustic medium as the continuous phase, liquid hydrocarbon droplets as the dispersed phase—said droplets providing at least a substantial part of said dispersed system—and a grease-like appearance and from which a clear, essentially aqueous-medium-free liquid hydrocarbon is readily separable, (b) controlling the intermingling means whereby said dispersed phase was formed to permit separation of a supernatant layer of liquid hydrocarbon above dispersed system in said zone, (c) passing feed liquid hydrocarbon into a lower portion of said dispersed system in said zone and (d) withdrawing a clear, essentially aqueous-medium-free liquid hydrocarbon product from said supernatant layer.

2. The method of claim 1 where said hydrocarbon droplets provide the predominate part of the dispersed liquid system.

3. The method of claim 1 wherein said contacting is carried out at a temperature between about 50° F. and 300° F.

4. The method of claim 1 wherein said zone is provided with mixing means of the type of propeller mixers and turbine mixers, and said mixer is positioned in at least a proximate relation to said aqueous medium.

5. The method of claim 4 where said mixing means is a turbine mixer and said mixer is positioned within said aqueous medium.

6. The method of claim 1 wherein said solid is charcoal.

7. The method of claim 1 wherein said solid is fuller's earth.

8. The method of claim 1 wherein said medium is doctor solution.

References Cited in the file of this patent

UNITED STATES PATENTS

| | | |
|---|---|---|
| 1,684,489 | Halloran | Sept. 18, 1928 |
| 1,704,246 | Halloran | Mar. 5, 1929 |
| 2,356,890 | Schulze | Aug. 29, 1944 |
| 2,717,859 | Krause | Sept. 13, 1955 |
| 2,727,850 | Stanley et al. | Dec. 20, 1955 |
| 2,754,251 | Gordon et al. | July 10, 1956 |
| 2,795,531 | Megnerian et al. | June 11, 1957 |
| 2,922,758 | Kostyreff | Jan. 26, 1960 |
| 2,979,548 | Clarke | Apr. 11, 1961 |
| 3,011,970 | Goodmann et al. | Dec. 5, 1961 |

UNITED STATES PATENT OFFICE

CERTIFICATE OF CORRECTION

Patent No. 3,075,914 January 29, 1963

Eugene P. Goodmann et al.

It is hereby certified that error appears in the above numbered patent requiring correction and that the said Letters Patent should read as corrected below.

Column 1, line 37, for "of" read -- at --; column 2, line 1, for "characteristics" read -- characteristic --; column 6, line 1, strike out "captides" and insert instead -- and is rich in mercaptans in the form of alkali metal mercaptides --; column 7, line 1, strike out "and is rich in mercaptans in the form of alkali metal mer- --; line 51, for "though" read -- thought --; line 70, for "providing" read -- proving --.

Signed and sealed this 20th day of August 1963.

(SEAL)
Attest:

ERNEST W. SWIDER
Attesting Officer

DAVID L. LADD
Commissioner of Patents